No. 647,808. Patented Apr. 17, 1900.
E. CURREN.
CLUTCH PULLEY.
(Application filed Dec. 6, 1899.)
(No Model.)
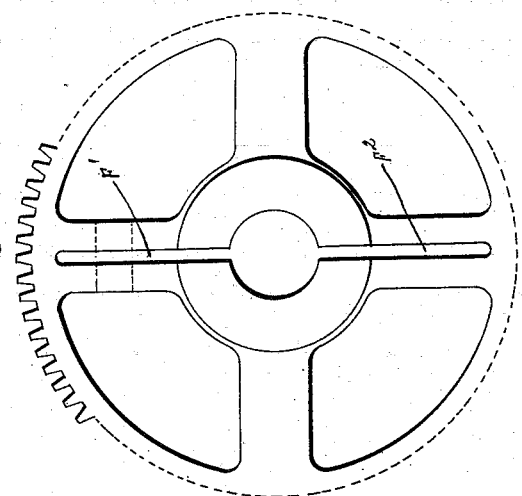
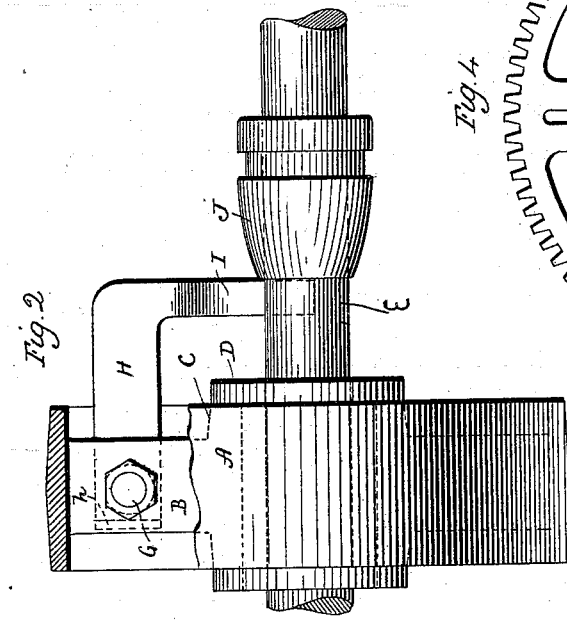
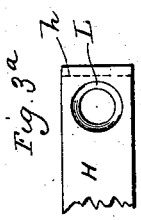
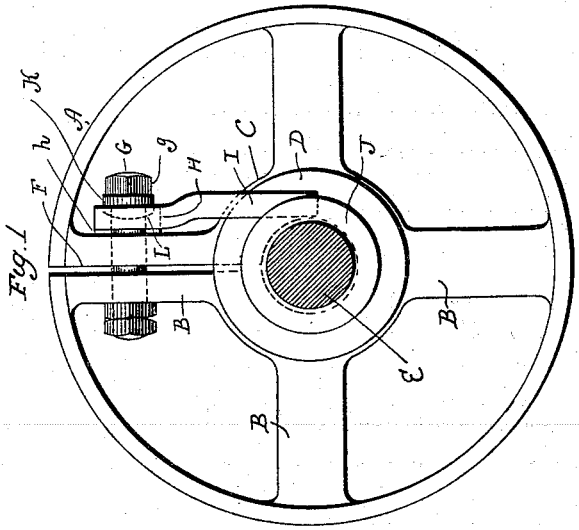
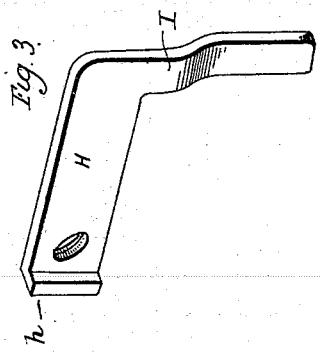
Witnesses
J. H. Shumway
Lillian D. Kelsey
Edward Curren, Inventor
By attys. Seymour & Earle
THE NORRIS PETERS CO., PHOTO-LITHO., WASHINGTON, D. C.

UNITED STATES PATENT OFFICE.

EDWARD CURREN, OF NEW HAVEN, CONNECTICUT.

CLUTCH-PULLEY.

SPECIFICATION forming part of Letters Patent No. 647,808, dated April 17, 1900.

Application filed December 6, 1899. Serial No. 739,341. (No model.)

*To all whom it may concern:*

Be it known that I, EDWARD CURREN, of New Haven, in the county of New Haven and State of Connecticut, have invented a new Improvement in Clutch-Pulleys; and I do hereby declare the following, when taken in connection with the accompanying drawings and the letters of reference marked thereon, to be a full, clear, and exact description of the same, and which said drawings constitute part of this specification, and represent, in—

Figure 1, an end view of a clutch-pulley constructed in accordance with my invention; Fig. 2, a side view of the same, partially in section; Fig. 3, a perspective view of the clamping-lever; Fig. $3^a$, a broken side view of the inner end of the clamping-lever; Fig. 4, a modification.

This invention relates to an improvement in clutch-pulleys, and particularly to that class in which the clutch is operated by a slide on the shaft adapted to throw or turn a lever, whereby the clutch mechanism is moved into or allowed to move out of its operating position, the object of the invention being a simple construction whereby pulleys of ordinary construction may be readily adapted to operate as clutch-pulleys; and it consists in the construction as hereinafter described, and particularly recited in the claim.

The pulley-wheel A is of substantially usual construction and, as herein shown, is formed with four arms B, extending radially outward from a hub C to the rim, which is formed of a single piece. As herein shown also, the hub C is seated upon a bushing D, which is fixed to the shaft E; but it is evident that the hub C may be adapted to closely fit the shaft. Extending through the rim A, one of the arms B, and into the hub C is a slot F, and transversely through the slotted arm is an opening to receive a bolt G, by which a lever H is connected with the divided arm, and this lever extends beyond the pulley and is provided at its outer end with an inturned finger I, which extends into the path of a slide J, mounted on the shaft E and adapted to be moved toward or from the pulley. The inner end of the lever is formed with a lug $h$, adapted to bear upon the adjacent surface of the arm, and between the lever and the head $g$ of the bolt is a washer K, preferably convex on the side next to the lever, which is formed with a recess L to receive it. The slide J has an inclined surface which when the slide is moved toward the pulley will force the finger I outward, and hence turn the lever H, which, having a bearing on the arm of the pulley beyond the bolt G, will act to draw the parts of the divided arm together, and thereby contract the hub and clamp the pulley onto the shaft E or bushing D. As soon as the slide J is withdrawn the normal spring of the metal will cause the hub to expand and leave the pulley free from the shaft, which may continue its rotation without moving the pulley. The face of the pulley may be adapted for a belt, as shown in Figs. 1, 2, and 3, or it may be furnished with gear-teeth, as shown in Fig. 4. In some cases, and particularly when gear-teeth are employed, it may be objectionable to divide the rim, in which case slots $F'$ $F^2$ may extend from the hub into two or more of the arms, as shown in Fig. 4, and so as to provide sufficient spring to permit the hub to be contracted and clamp the pulley upon the shaft or bushing.

It will thus be seen that pulleys of ordinary construction may with but little difficulty be adapted for use as clutch-pulleys.

I am aware that it is old to split the hubs of pulleys, whereby they may be clamped onto a shaft, and I am also aware that it is not new to operate a clutch-pulley by means of a cam on the shaft and a lever connected with the clamping mechanism, and therefore do not wish to be understood as claiming such as my invention; but, Having fully described my invention, what I claim as new, and desire to secure by Letters Patent, is—

A clutch-pulley having a single-piece rim and a slot extending through the hub and one of the arms, a bolt extending transversely through said arm near the outer end thereof, a lever mounted on said bolt and having a bearing on the arm beyond the bolt, said lever formed with an inwardly-extending finger, and a slide adapted to force said finger outward, whereby the parts of the slotted arm are drawn together and the hub contracted, substantially as described.

In testimony whereof I have signed this specification in the presence of two subscribing witnesses.

EDWARD CURREN.

Witnesses:
 FRED C. EARLE,
 LILLIAN D. KELSEY.